(12) United States Patent
Gustavsson

(10) Patent No.: US 6,509,984 B1
(45) Date of Patent: Jan. 21, 2003

(54) CROSSTALK REDUCTION IN A BIDIRECTIONAL OPTICAL LINK

(75) Inventor: Mats Gustavsson, Stockholm (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/198,330

(22) Filed: Nov. 24, 1998

(30) Foreign Application Priority Data

Nov. 24, 1997 (SE) .............................................. 9704307

(51) Int. Cl.[7] .................................................. H04J 14/02
(52) U.S. Cl. .......................... 359/114; 359/152; 359/163
(58) Field of Search ................................. 359/113, 114, 359/143, 111, 154, 168, 152

(56) References Cited

U.S. PATENT DOCUMENTS

| | | | |
|---|---|---|---|
| 4,750,799 A | * 6/1988 | Kawachi et al. | 350/96.11 |
| 4,815,081 A | 3/1989 | Mahlein et al. | 273/32 |
| 5,031,188 A | 7/1991 | Koch et al. | 372/50 |
| 5,140,152 A | * 8/1992 | Van Zeghbroek | 250/214 |
| 5,144,637 A | 9/1992 | Koch et al. | 372/50 |
| 5,307,192 A | * 4/1994 | Schroder et al. | 359/135 |
| 5,384,651 A | * 1/1995 | Van De Voorde et al. | 359/152 |
| 5,408,350 A | * 4/1995 | Perrier et al. | 359/168 |
| 5,416,627 A | * 5/1995 | Wilmoth | 359/159 |
| 5,430,568 A | 7/1995 | Little et al. | 359/124 |
| 5,479,539 A | 12/1995 | Goldsmith et al. | 385/14 |
| 5,633,741 A | * 5/1997 | Giles | 359/124 |
| 5,652,813 A | * 7/1997 | Wilson | 359/154 |
| 5,712,864 A | * 1/1998 | Goldstein et al. | 372/50 |
| 6,148,182 A | * 11/2000 | Thornton | 455/88 |
| 6,211,978 B1 | * 4/2001 | Wojtunik | 359/114 |

FOREIGN PATENT DOCUMENTS

| | | |
|---|---|---|
| EP | 795 910 A1 | 9/1997 |
| GB | 2243720 A | 11/1991 |

OTHER PUBLICATIONS

P.A. Anderkson and N.A. Olsson, (AT&T Bell Laboratories): "Optical Full–Duplex Transmission with Diode Laser Amplifiers," J. Lightwave Technol., vol. 9, pp. 737–740, 1991.

K.T. and R. Olshansky (GTE Laboratories Inc.): "Simultaneous Optical Amplification, Detection and Transmission Using In–Line Semiconductor Laser Amplifiers," IEEE Photon. Technol. Lett., vol. 4, pp. 441–443, 1992.

A. Uskov, J. Mørk, and J. Mark, "Theory of Short–Pulse Gain Saturation in Semiconductor Laser Amplifiers," IEEE Photon. Technol. Lett., vol. 4 pp. 1041–1135, 1992.

R.A. Linke, K.C. Reichmann, T.L. Koch, and U.Koren, Full–Duplex Optical Transmission Using Self–Heterodyne Laser Transceivers, IEEE Photonics Technology Letters, vol. 1, No. 9, Sep. 1989.

* cited by examiner

*Primary Examiner*—Leslie Pascal
(74) *Attorney, Agent, or Firm*—Burns, Doane, Swecker & Mathis, L.L.P.

(57) ABSTRACT

The present invention relates to a method and a device for crosstalk reduction in a communication link for simultaneous and bidirectional optical transmission. In order to reduce crosstalk, two different optical wavelengths and two different electrical carrier frequencies are utilised. Applications of interest include optically based subscriber access systems and systems for optical interconnections in various information processing systems, such as computers.

16 Claims, 3 Drawing Sheets

Longitudinally Integrated

CROSSTALK REDUCTION IN A BIDIRECTIONAL OPTICAL LINK

This application claims priority under 35 U.S.C. §§119 and/or 365 to 9704307-9 filed in Sweden on Nov. 24, 1997; the entire content of which is hereby incorporated by reference.

FIELD OF THE INVENTION

The present invention relates to a method and a device for crosstalk reduction in a communication link for simultaneous and bidirectional optical transmission.

Cost reduction for subscriber access equipment can potentially be attained if the required photonic devices, laser transmitters and photodetectors, are monolithically integrated on one common semiconductor substrate and if the communication link needs only to use one single optical fibre i.e. not a fibre pair. Such devices have been realised, but they may be limited by crosstalk between the two contradirectional information streams. Sources of crosstalk in these devices include e.g. undesired absorption or electroabsorption of transmitted light in the photodetectors and electrical leakage between the lasers and the photodetectors.

BACKGROUND OF THE INVENTION

Over the years, several devices and systems for full-duplex transmission over one single optical fibre have been proposed and demonstrated. By way of using distributed Bragg reflector lasers as self-heterodyne laser transceivers, full-duplex 40 Mb/s frequency shift keying (FSK) transmission has been shown to be possible if the known, modulating signal is subtracted from the heterodyned signal, see e.g. R. A. Linke, K. C. Reichmann, T. L. Koch, U. Koren (AT&T Bell Laboratories): "Full-duplex optical transmission using self-heterodyne laser transceivers", IEEE Photon. Technol. Lett., vol.1, pp. 278–280, 1989. In another example, each of the two terminals consists of one single semiconductor optical amplifier, one of which is directly modulated by the data, whereas the other is driven by a 320 MHz electrical subcarrier modulated with 50 Mb/s data, see e.g. P. A. Andrekson, N. A. Olsson (AT&T Bell Labooratories): "Optical full-duplex transmission with diode laser amplifiers", J. Lightwave Technol., vol. 9, pp. 737–740, 1991. In such a configuration crosstalk will be to some extent avoided between the two channels. While the maximum usable bit rate in both these schemes is inherently limited by the time constant associated with the carrier dynamics of forward biased laser structures, the latter is also limited by dispersion occuring in the transmission fibre due to the use of broadband light sources. Residual crosstalk may also be a limiting factor in these two techniques. Another example of an optical communication system, although not bi-directional in its nature, that relies on the use of an electrical subcarrier, may demonstrate simultaneous transmission and detection of 10 Mb/s and optical amplification of 622 Mb/s data in a semiconductor optical amplifier, see e.g. K. T. Koai, R. Olshansky (GTE Laboratories Inc.): "Simultaneous optical amplification, detection and transmission using in-line semiconductor laser amplifiers", IEEE Photon. Technol. Lett., vol. 4, pp. 441–443, 1992. Also in this case the bit rates of transmitted and detected signals are limited by the carrier dynamics of the laser amplifier. At the expense of more complicated photonic devices, that is, using a single-mode laser transmitter in conjunction with a separate, high speed photodetector, the limitations relating to dispersion, speed and to an extent crosstalk, can be partially circumvented. Devices with longitudinally integrated laser and photodetector sections have been described in the following patents: U.S. Pat. Nos. 5,031,188, 5,144, 637 and GB-A 2 243 720 to T. L. Koch, H. Kogelnik, U. Koren (AT&T Bell Laboratories).

In another implementation scheme, see, e.g., W. Metzger, J. G. Bauer, P. Clemens, G. Heise, M. Klein, H. F. Mahlein, R. Matz, H. Michel, J. Rieger (Siemens AG): "Photonic integrated transceiver for the access network", Proc. 20th European Conference on Optical Communication, post-deadline paper, pp. 87–90, 1994, the laser source and monitor photodetector are integrated in one waveguide branch whereas the receiver photodetector is integrated in another waveguide branch; these two waveguide branches are separated by means of a wavelength-selective structure.

In FIG. 1 an optical communication link for simultaneous and bidirectional transmission is illustrated employing an example of the devices of the aforesaid type, wherein the wavelength corresponding to the energy bandgap of the semiconductor material used in the various sections of the two terminal devices is indicated in units of micrometers. Although such devices present advantages compared to alternative solutions, they may introduce too high crosstalk because of non-negligible optical and/or electrical leakage between the two contra-directional channels. Terminals can be implemented using hybrid or monolithic integration methods. Various material systems are of interest for their realisation, e.g., InGaAsP/InP and $SiO_2/Si$.

SUMMARY OF THE INVENTION

In order to reduce the aforesaid crosstalk, a method and device will be suggested, wherein transmission in the two directions utilises two different optical wavelengths as well as two different electrical carrier frequencies. Transmission in one of the directions may utilise baseband transmission, i.e. a zero frequency electrical carrier. Applications of interest include optically based subscriber access systems and systems for optical interconnections in various information processing systems, such as computers. It is of interest that the equipment for such systems can be produced using relatively simple processes to allow for low cost. In certain applications it is also desirable that these full-duplex optical links can be operated at high bit rates.

DETAILED DESCRIPTION OF THE PREFERRED EMBODIMENTS

Figure 1:
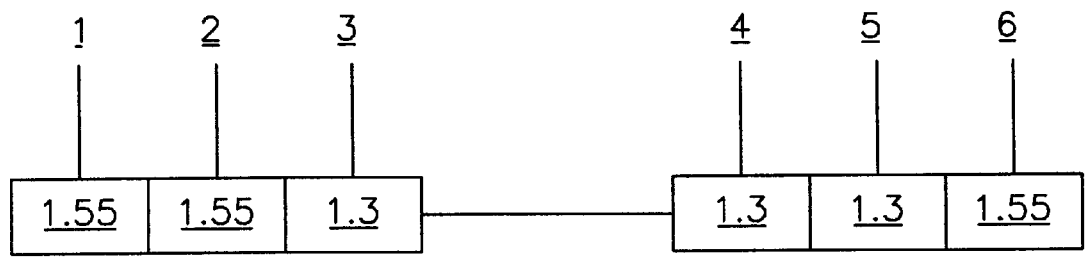
FIG. 1 is a schematic illustration of an optical communication link for simultaneous bidirectional transmission.

In one of the above examples of the implementations of an integrated component for simultaneous and bidirectional optical communication, the laser section and the photodetector section are integrated on one common semiconductor substrate, but their structures utilize material compositions corresponding to different energy bandgaps, as in FIG. 1 where a schematic illustration of an optical communication link for simultaneous and bidirectional transmission is shown. Terminals can be implemented using hybrid or monolithic integration methods. As discussed above, it is well known in the art that various material systems may be used in the compositions, such as InGaAsP/InP and $SiO_2$/Si. For example, a terminal may be comprised of InGaAsP/InP.

Two slightly different components are required at the two ends of the communication link, see FIG. 1. In one of these devices, the material composition of the receiver photodetector is chosen such that it is essentially transparent to the light emitted by the laser section. However, a fraction of the light emitted by the laser section will be absorbed by the receiver-photodetector section anyway, thus giving rise to crosstalk. The electrical crosstalk may be a limiting factor, too. Crosstalk will arise also in the other terminal, wherein the design of that terminal is similar to the design of the terminal just described. In the link comprising these two terminals, and an optical fibre to connect them, it would be simple to use baseband signals for the down-stream as well as for the up-stream signal; however, this situation is not attractive from a crosstalk point of view. On the other hand, if the data of one of these signals is impressed on an electrical carrier using a suitable, conventional electrical modulation technique, the two signals can be processed in essentially two different parts of the electrical frequency domain, if the frequency of the electrical carrier is sufficiently large. Such a situation, which is schematically illustrated in FIG. 2 and in FIG. 3, relaxes requirements on accceptable optical and electrical leakage levels between the receiver-photodetector section and the laser section in the monolithic photonic device.

Figure 2:
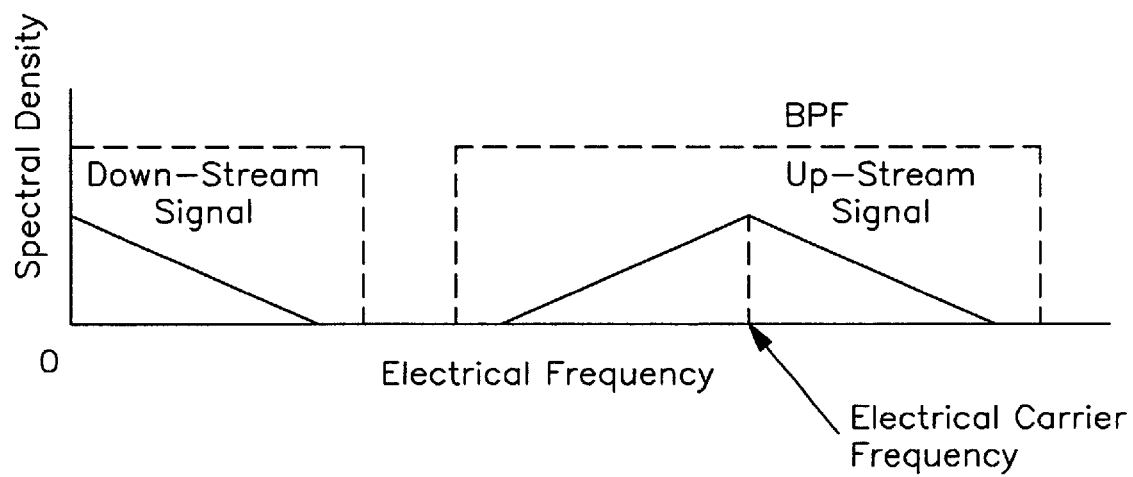
FIG. 2 is a schematic illustration of an example of a possible location of the down-stream and up-stream signals in the electrical frequency domain according to the invention.

In FIG. 2 an example of a possible location of the down-stream and up-stream signals is schematically shown in the electrical frequency domain. The dashed lines give a rough indication of possible, schematic low-pass filter (LPF) and band-pass filter (BPF) shapes further discussed in FIG. 3.

Figure 3:
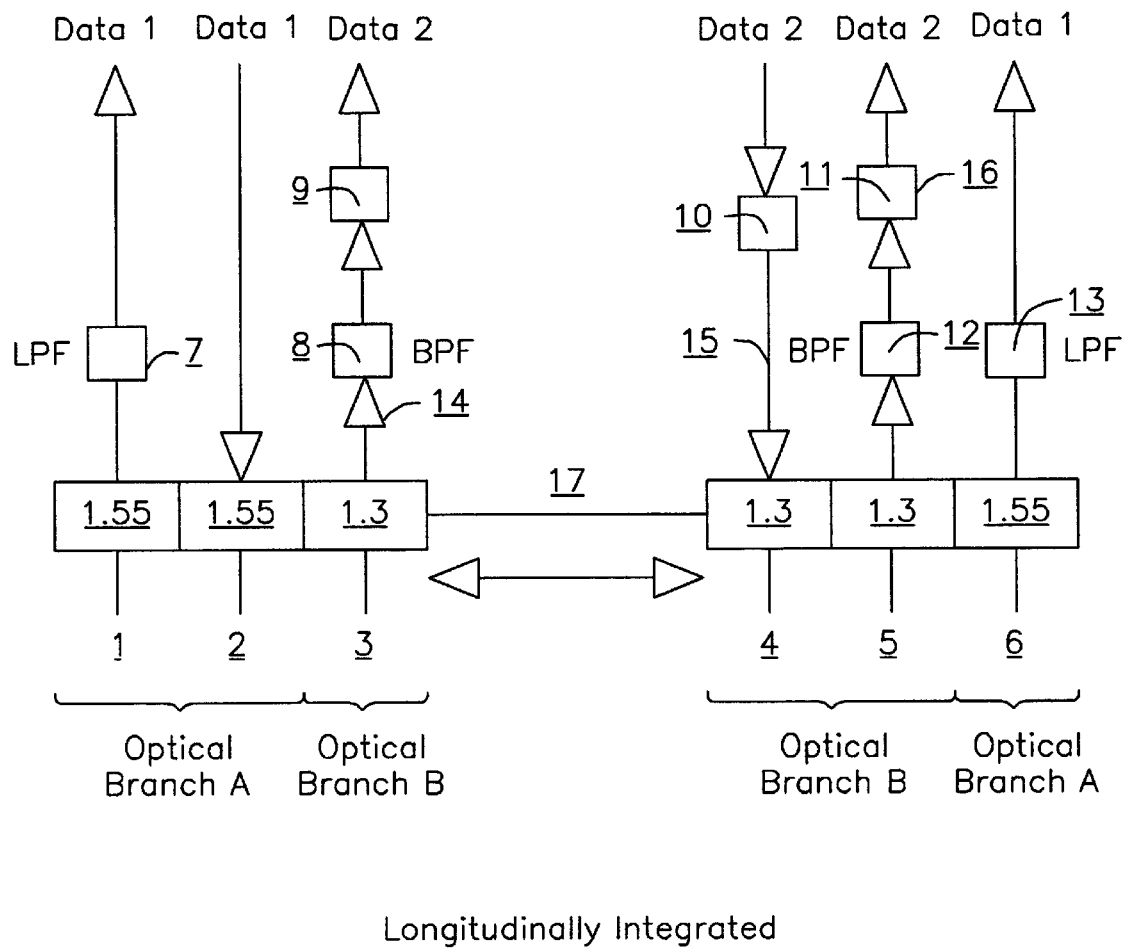
FIG. 3 is an example of a more detailed, but still a very schematic implementation of an electrical ciruitry at two terminals of a link according to the invention.

In FIG. 3, an example of a more detailed, but still very schematic, implementation of an electrical circuitry according to the invention is shown at the two terminals of the link. Each of the terminals are "longitudinally integrated". That is to say that in each terminal the respective sections, i.e., monitor-photodetector section, laser section, and receiver-photodetector section, operate on the same longitudinal plane with respect to the propagating light waves. Bidirectional wave propagation is possible due in part to the optical branching configuration of each terminal, which provides the necessary wavelength-selective structure in each terminal. As illustrated in the left terminal of FIG. 3, 1550 nm monitor-photodetector section 1 and 1550 nm laser section 2 make up optical branch A, while 1300 nm receiver-photodetector section 3 makes up optical branch B. Similarly, in the right terminal, 1550 nm receiver-photodetector section 6 makes up optical branch A, while 1300 nm laser section 4 and 1300 nm monitor-photodetector section 5 make up optical branch B.

In operation, at the left terminal, the 1550 nm laser section 2 is directly modulated by the bit stream data 1, which is to be transferred to the terminal to the right. The output of the laser is monitored through direct detection of the bit stream in the 1550 nm monitor-photodetector section 1, followed by electrical filtering in a low-pass filter (LPF) 7 to suppress crosstalk due to the other channel. After transmission through the optical fibre 17, the bit stream data 1 at 1550 nm wavelength propagates through the 1300 nm laser section 4 and through the 1300 nm monitor-photodetector section 5, both of which are essentially transparent to the 1550 nm signal bit stream, and is subsequently directly detected by the 1550 nm receiver-photodetector section 6 in the terminal to the right, and low-pass filtered to suppress crosstalk due to the other channel. At the terminal to the right, the information data 2 is impressed on an electrical carrier, which is indicated by the box "electrical modulation" 10. The resulting signal drives the 1300 nm laser section 4.

The output of the laser is monitored by way of demodulation, which is indicated by the box "electrical demodulation" 11, of the signal detected in the 1300 nm monitor-photodetector section 5, preceded by filtering in a band-pass filter (BPF) 12 to suppress crosstalk due to the other channel. After transmission through the optical fibre 17, the bit stream data 2 is obtained through a corresponding bandpass filtering 8 and demodulation 9 of the signal, which is detected by the 1300 nm receiver-photodetector section 3 in the terminal to the left. Suitable, conventional techniques can be used to perform the electrical modulation and demodulation, of which details are not shown. It should be underlined that no details concerning required synchronization or decision circuits have been described here.

Since the up-stream and the down-stream signals are now separated in the electrical domain, a potentially substantial reduction of crosstalk should be obtainable, without the need for better and probably more complex integration solutions. At the two terminals, the two contra-directional channels are actually separated in the spatial domain and the optical wavelength domain as well as in the electrical frequency domain, which is attractive from the crosstalk point of view. Because bit rates of the order of 100 Mb/s or more precisely 155 Mb/s, the bit rate of STM-1 of the SDH, are expected to be sufficient for subscriber use, the electrical carrier required should not need to be exceedingly high. An electrical carrier of the order of 1 GHz might be sufficient for significant reduction of crosstalk in this case. Introduction of a 1 GHz electrical carrier frequency is expected to influence the cost of the system, wherein this issue should, of course, be investigated in detail. Notice that systems operating at higher speeds, in the Gb/s range, should be possible, because photodetectors with bandwidths of the order of tenths of GHz can be implemented. The present configuration therefore offers a full duplex optical communication link using relatively simple photonic devices, with reduced crosstalk between the two contra-directional channels and potential for comparatively high transmission capacity.

What is claimed is:

1. A method for crosstalk reduction in a bidirectional optical communication link between two terminals, comprising the step of:

simultaneously transmitting data in two directions over the communication link utilizing two different optical wavelengths as well as two different electrical-carrier frequencies, wherein a laser section comprising a laser source, a monitor photodetector section comprising a monitor photodetector, and a receiver photodetector section comprising a receiver photodetector are integrated in each of the two terminals to optically transmit, monitor, and receive data in a first and second direction over said communication link utilizing the two different optical wavelengths and the two different electrical-carrier frequencies, at least one of the optical wavelengths propagating through at least one of the monitor photodetector sections to be received by the receiver photodetector, the monitor photodetector section being essentially transparent to the at least one optical wavelength.

2. The method of claim 1, wherein transmission in one of the two directions utilizes baseband transmission with a zero frequency electrical carrier.

3. The method of claim 1, wherein the data is transmitted utilizing different optical signals that are directly modulated.

4. A device for crosstalk reduction in a communication link between two terminals for simultaneous and bidirectional optical transmission comprising:

first means for optically transmitting data in a first direction over said link utilizing a first optical wavelength and a first electrical carrier frequency; and second means for optically transmitting data in a second direction over said link utilizing a second optical wavelength and a second electrical carrier frequency, wherein the first and second means are integrated in each of the two terminals, each terminal comprising a laser section comprising a laser source, a monitor photodetector section comprising a monitor photodetector, and a receiver photodetector section comprising a receiver photodetector, at least one of the optical wavelengths propagating through at least one of the monitor photodetector sections to be received by the receiver photodetector, the monitor photodetector section being essentially transparent to the at least one optical wavelength.

5. The device of claim 4, wherein the means are provided in two terminals, which are each hybrid integrated.

6. The device of claim 5, wherein the means are provided in photonic circuitries, wherein the photonic circuitry of each of the two terminals is monolithically integrated.

7. The device of claim 5, wherein the means are provided in photonic circuitries, wherein the photonic circuitry of each of the two terminals is hybrid integrated.

8. The device of claim 4, wherein the means are provided in two terminals, which are each monolithically integrated.

9. The device of claim 4, wherein transmission in one of the directions utilizes baseband transmission with a zero frequency electrical carrier.

10. The device of claim 4, wherein the laser source, the monitor photodetector and the receiver photodetector are longitudinally integrated.

11. The device of claim 4, wherein the laser source and the monitor photodetector are longitudinally integrated in one optical branch, whereas the receiver photodetector is integrated in another optical branch.

12. The device of claim 11, wherein the two branches are separated by means of a wavelength-selective structure.

13. The device of claim 4, wherein each of the two terminals is implemented using a InGaAsP/lnP material system.

14. The device of claim 4, wherein the photonic circuitry of each of the two terminals is implemented using waveguides and guided-wave devices.

15. The device of claim 4, wherein the optical wavelengths used for transmission in the two directions are around 1.3 $\mu$m and 1.5 $\mu$m, respectively.

16. The device of claim 4, wherein means for optically transmitting data in a first direction and the means for optically transmitting data in a second direction directly modulate respective optical signals.

* * * * *